Aug. 19, 1924.
P. E. NORRIS
STORAGE BATTERY CASE
Filed Dec. 13, 1922
1,505,796
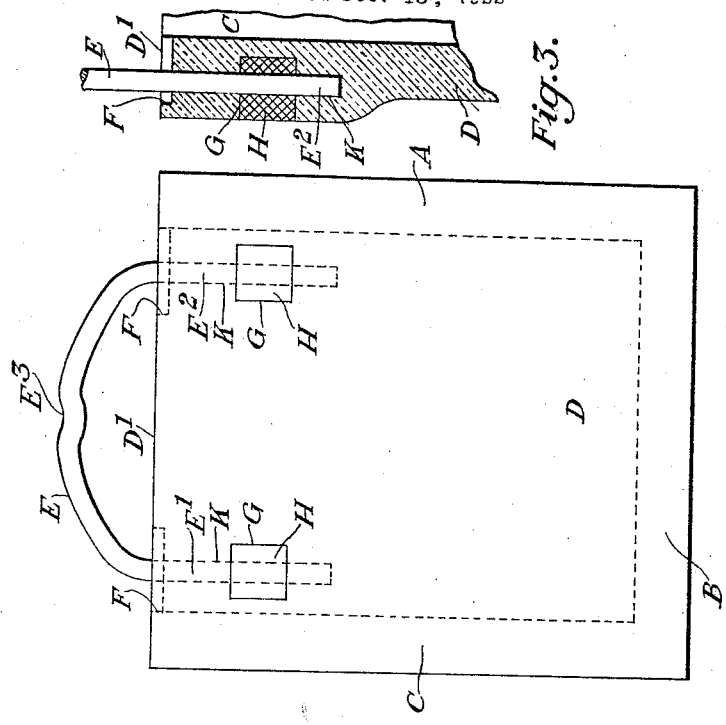
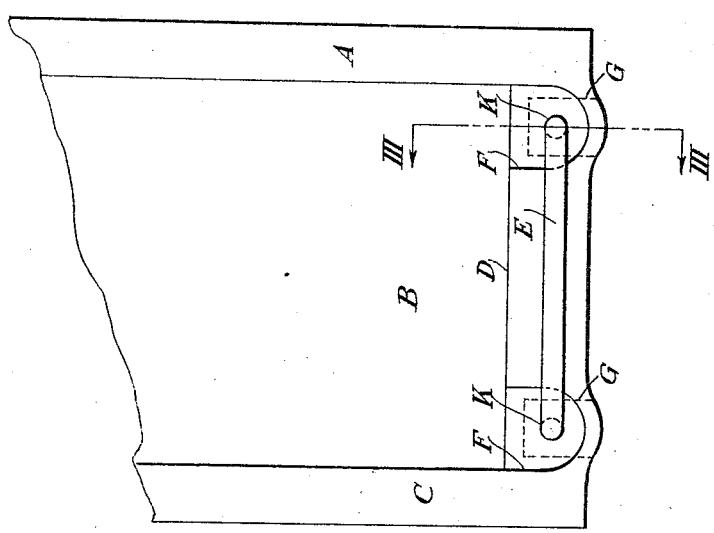
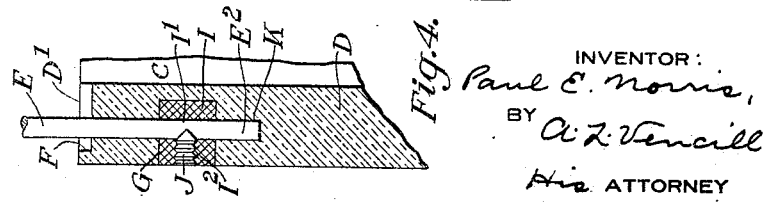
INVENTOR:
Paul E. Norris,
BY A. L. Vencill
His ATTORNEY Patented Aug. 19, 1924.

1,505,796

UNITED STATES PATENT OFFICE.

PAUL E. NORRIS, OF WILKINSBURG, PENNSYLVANIA, ASSIGNOR TO WESTINGHOUSE UNION BATTERY COMPANY, OF SWISSVALE, PENNSYLVANIA, A CORPORATION OF PENNSYLVANIA.

STORAGE-BATTERY CASE.

Application filed December 13, 1922. Serial No. 606,603.

*To all whom it may concern:*

Be it known that I, PAUL E. NORRIS, a citizen of the United States, residing at Wilkinsburg, in the county of Allegheny and State of Pennsylvania, have invented certain new and useful Improvements in Storage-Battery Cases, of which the following is a specification.

My invention relates to storage battery cases, and particularly to cases of the type comprising a box or a container provided with lifting means.

I will describe one form of storage battery case embodying my invention, and will then point out the novel features thereof in claims.

In the accompanying drawings, Fig. 1 is a view showing in end elevation, one form of storage battery case embodying my invention. Fig. 2 is a fragmental top view of the storage battery case shown in Fig. 1. Fig. 3 is a fragmental sectional view on the plane III—III in Fig. 2 looking in the direction indicated by the arrows. Fig. 4 is a fragmental sectional view similar to Fig. 3 but showing a modification of the means for securing the handle to the battery case shown in Figs. 1, 2 and 3 and also embodying my invention.

Similar reference characters refer to similar parts in each of the several views.

Referring first to Figs. 1 and 2 the battery case comprises a bottom B, sides C and A, and two end plates, only one of which, D, is shown in Fig. 2. It is understood that the other end plate of the case is similar in all respects to end plate D and that the following discussion with relation to end plate D is equally applicable to the other end plate. The material of the case may be any conveniently moulded material which is impervious to the action of battery electrolyte, such as hard rubber or celluloid. This case is preferably made by moulding the sides, ends and bottom in one integral piece of hard rubber. The end plate D is provided with two downwardly extending holes K, substantially vertical and spaced well toward the sides of the case as shown in the drawing. Communicating with each of these holes K is a horizontal recess G, which opens outward from the surface of the end plate D. This recess G is best shown in Fig. 3, and may be of any convenient shape as square and extends beyond the hole K but does not communicate with the interior of the battery case. The handle E comprises a rod or tube of some suitable material as brass or steel bent into an arch shape and having two substantially parallel legs E' and E². This handle is so proportioned that the projecting legs E' and E² will enter the holes K in end plate D with a snug fit. After inserting the handle E in the holes K, molten lead is poured into the recesses G. This lead solidifies around the handle legs E' and E² and thus prevents them from being withdrawn.

In operation the acid of the electrolyte is often spilled on the upper surface of the battery and is likely to flow or creep over the end plates D. In this event with only the arrangement thus far explained the acid would enter the inevitable small openings where the legs E' and E² enter the holes K, and would result in corrosion of the metal handle. In my invention I prevent this by providing the top edge of end plate D with two shallow depressions or recesses F opening into the battery case and each completely surrounding one leg of the handle E. When the battery is assembled, sealing compound is poured over the cells and fills the case up to the top edge D'. In so doing this sealing compound flows into the recesses F and around the handle E, thus effectually preventing the seepage of electrolyte into the holes K. The holes K, the passages G and the recesses F may be moulded into the case or they may be cut in the case after it is manufactured. The handle E may be provided with an indentation E³ for engaging a battery hold down in the usual manner.

As shown in Fig. 4 I secure the handle in the case by means of a pre-cast metal member I which is inserted in each recess G. This member is provided with a vertical hole I' for accommodating the leg E² of the handle E and with a threaded hole I², intersecting hole I' and provided with a set screw J. In assembling this structure, the member I is inserted in recess G in such manner that hole I' registers with hole K. The handle E is then inserted in the end plate D, the leg E² passing through holes K and I'. The set screw J is then inserted in hole I² and forced into the leg of the handle E, clamping this handle in place. The sealing compound may then be poured around the handle in recess F as before. The material of member I may be any suitable substance as lead, brass or iron, and its shape may be square in cross section as shown in the drawing, or any other suitable shape. Two of the advantages resulting from this method of construction are that the handle may be easily removed for renewal, and that the handle may be applied after the battery is completely assembled but unsealed.

Although I have herein shown and described only two forms of storage battery cases embodying my invention, it is understood that various changes and modifications may be made therein within the scope of the appended claims without departing from the spirit and scope of my invention.

Having thus described my invention, what I claim is:

1. In combination, a storage battery case, a handle inserted in a wall of said case, and a recess in said wall surrounding said handle and communicating with the interior of said case but not with the exterior thereof.

2. In combination, a storage battery case, a handle inserted in said case, and means for preventing the entrance of electrolyte between said case and said handle.

3. In combination, a storage battery case, a handle inserted in said case, and means for producing a liquid tight joint between said case and said handle.

4. In combination, a storage battery case having a hole for receiving a handle and a recess communicating with said hole for receiving melted lead thereby retaining said handle in said hole.

5. In combination, a wall of a storage battery case, two holes in said wall adjacent the abutting sides of the case, a handle having two legs adapted to enter said holes, and a recess in said wall surrounding each of said legs and communicating with the interior of the case for containing sealing material.

6. In combination, a storage battery case having a handle receiving hole, a handle inserted in said hole, and a mass of acid resisting substance surrounding said handle where the handle enters the case.

In testimony whereof I affix my signature.

PAUL E. NORRIS.